United States Patent [19]
Brown et al.

[11] Patent Number: 5,563,392
[45] Date of Patent: Oct. 8, 1996

[54] METHOD AND APPARATUS FOR MONITORING WEAR OF A CONTINUOUS CHAIN

[75] Inventors: Patrick A. Brown, Fremont; Patrick J. Murphy; Mark H. Meade, both of Muskegon, all of Mich.

[73] Assignee: Patco Sales & Service, Inc., Fremont, Mich.

[21] Appl. No.: 420,579

[22] Filed: Apr. 12, 1995

[51] Int. Cl.⁶ .................................................. G06M 1/00
[52] U.S. Cl. ........................ 235/91 R; 73/828; 324/206
[58] Field of Search .................................. 198/341, 468, 198/356, 365; 324/206; 73/432.1, 828; 235/91 R

[56] References Cited

U.S. PATENT DOCUMENTS

| | | | |
|---|---|---|---|
| 3,989,989 | 11/1976 | Mayer | 318/72 |
| 3,998,317 | 12/1976 | Stinnett | 198/341 |
| 4,274,783 | 6/1981 | Eineichner et al. | 198/356 X |
| 4,407,162 | 10/1983 | Landenberger | 73/527 |
| 4,506,763 | 3/1985 | Frost et al. | 184/15.2 |
| 4,537,285 | 8/1985 | Brown et al. | 184/15.2 |
| 4,648,486 | 3/1987 | Kayser et al. | 184/15.1 |
| 5,092,446 | 3/1992 | Sullivan et al. | 198/323 |
| 5,248,027 | 9/1993 | Kluger et al. | 198/502.4 |
| 5,291,131 | 3/1994 | Suzuki et al. | 324/206 |
| 5,337,885 | 8/1994 | Mills et al. | 198/502.4 |

*Primary Examiner*—Patrick J. Stanzione
*Attorney, Agent, or Firm*—Young & Basile, P.C.

[57] ABSTRACT

A method and apparatus for automatically and accurately monitoring the wear of a continuous conveyor chain without having to stop the chain. The present invention provides first and sensors means fixedly spaced along the conveyor chain at a predetermined distance. The first and second sensors generate signals corresponding to the presence and absence of successive links provided in the conveyor chain. The generated signals are received and processed and the necessary time intervals are calculated for providing an output indicative of chain wear of any portion of the chain several parameters of chain wear may be calculated, including chain stretch and instantaneous chain speed. The calculated chain wear values may be compared to predetermined values previously input and stored, and if the calculated values exceed the predetermined values, an indicator means indicates that the conveyor chain should be serviced.

23 Claims, 4 Drawing Sheets

ZERO CHAIN STRETCH
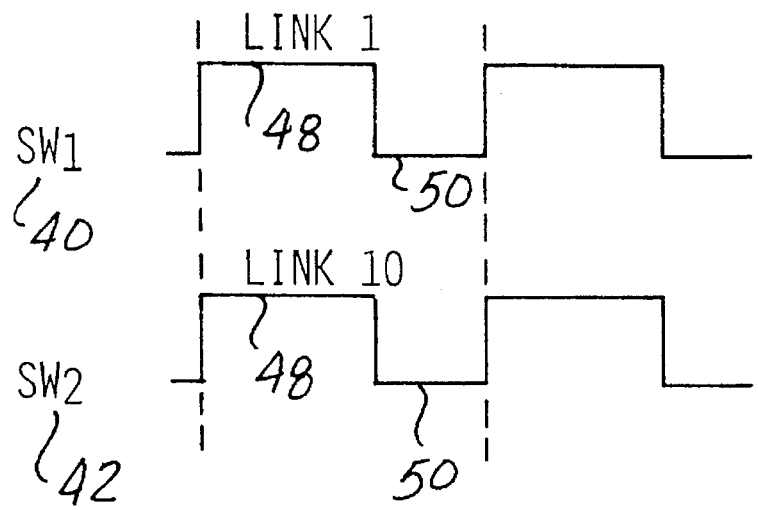
CHAIN STRETCH
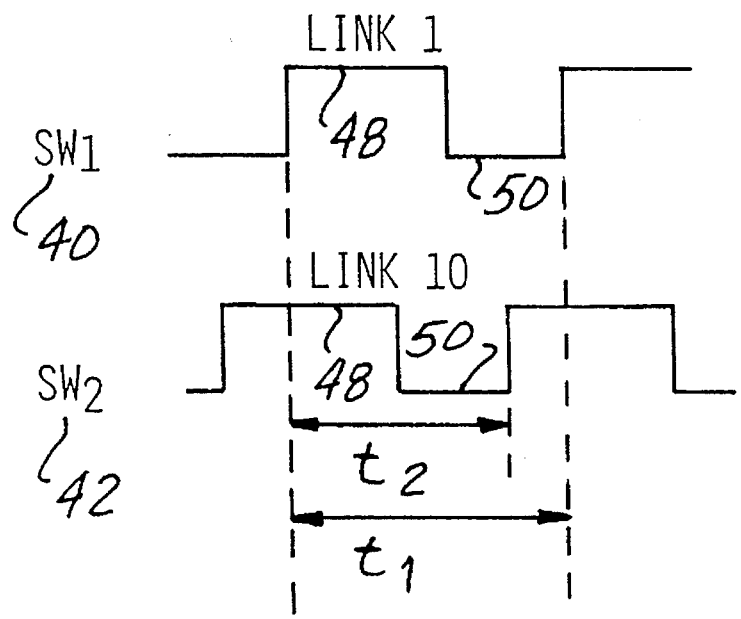
FIG-3

METHOD AND APPARATUS FOR MONITORING WEAR OF A CONTINUOUS CHAIN

FIELD OF THE INVENTION

The present invention relates, in general, to monitoring wear of a continuous chain and, more specifically, to an automatic and accurate method and apparatus for monitoring wear of a continuous conveyor chain without having to stop the chain.

BACKGROUND OF THE INVENTION

A common method of moving parts or components along a manufacturing assembly line is by means of overhead conveyors. Such conveyors may be formed of a number of wheeled trolleys which ride along a guideway or track in a continuous closed loop. The trolleys are connected by a conveyor chain formed of a number of connected links, and the parts or components are suspended from the trolley.

The conveyor chain is typically driven by a motorized sprocket assembly which provides force for powering the wheeled trolleys along the guideway or track. Although the wheeled trolleys and the parts or components suspended from the trolley have their weight supported by the guideway or track, the conveyor chain is still subjected to wear over an extended period of time. These conveyor chains may be very lengthy as they may travel and extend throughout a large production facility. Thus, such conveyor chains may be subjected to numerous random forces and stress as well as a variety of environmental conditions such as heat fluctuations, oils, solvents and other caustic solutions.

Due to the above-noted conditions, the wear of the conveyor chain should be monitored in order to prevent a conveyor chain from breaking or possibly damaging other components of the conveyor system. One of the most closely watched chain wear parameters is chain stretch which is defined as the linear distance in which the chain lengthens over a period of time due to wear. Chain stretch often occurs through the eventual wearing of the conveyor chain's pivot pins which are utilized to connect successive links of the chain. The movement of the pivot pins within the apertures of the links eventually wear and create "slop". This "slop" along with yielding of the links, will essentially make the conveyor chain longer when pulled taught.

Minor wear or chain stretch is allowable and expected within the industry, but when chain stretch becomes excessive, it may cause numerous problems. For one, the sprocket may not be able to properly engage the conveyor chain should the chain stretch become excessive enough that the teeth of the sprocket skip a space between links or apply forces to a link that may bend or damage the conveyor chain. Also, extensive chain stretch may cause the conveyor chain to sag thus affecting the smooth travel of the wheeled trolleys along the guideway or track. Yet, the greatest concern is that excessive chain stretch may lead to the eventual thinning and breaking of the conveyor chain.

In order to monitor the chain stretch of a conveyor chain, a certain length of the conveyor chain is often measured manually to ensure that the chain stretch does not exceed a predetermined value. It is well known and common in the art to monitor and measure ten foot sections of the conveyor chain. The problem with making such manual measurements is that the conveyor chain must be stopped in order to make a proper measurement. This requires that the entire conveyor be shut down which prevents and delays the parts or components delivered by the conveyor from being supplied to the assembly or production line. Obviously, this creates an inefficiency that is undesirable in a production environment.

In addition, manual measurements of chain stretch typically have the problem of being inaccurate as they are conducted with tape measures which can hardly be considered accurate for repetitive measurements of ten foot chain lengths. Also, the ten foot section of conveyor chain selected for measurement is typically random, and therefore, no recorded history exist or is maintained as to the wear of that particular section of conveyor chain. This becomes an even greater disadvantage when a portion of the chain has been replaced by either a different manufacturer or different material, and thus, an evaluation as to the performance and wear of the individual sections of the conveyor chain cannot be made. In addition, manual chain wear measurements rely on an operator to continually measure the conveyor chain. Should the operator fail to continually monitor the chain, any number of the above-noted results can occur.

SUMMARY OF THE INVENTION

The present invention solves the above-mentioned short comings by providing a method and apparatus for automatically monitoring wear of a continuous conveyor chain without having to stop the chain. The present invention provides a first and second sensing means spaced along the conveyor chain at a predetermined distance. The first and second sensing means generate signals that correspond to the presence and absence of links of the conveyor chain. The signals generated by the first and second sensing means are sent to a control means, wherein the signals are processed by a processing means, and the necessary time intervals are calculated to provide an output indicative of chain wear. The processing means processes the generated signals from the first and second sensing means by determining whether the signals are in a first state, wherein the presence of a link of the chain is detected, or in a second state, wherein the absence of a link of the chain is detected. A first time interval is determined by calculating the time difference between the actuation of the first and second sensing means into the first state. A second time interval is calculated by determining the time it takes for one chain pitch of the chain to travel past one of the first and second sensing means wherein the chain pitch is the linear distance between common locations on successive links. The control means also provides a program stored in memory to calculate a time ratio of the first time interval over the second time interval. The time ratio is compared to a predetermined value previously input and stored in the control means. If the output is greater than the predetermined value, the control means provides a means for indicating that the chain wear is excessive and that the chain should be serviced.

The present invention also determines the actual chain stretch of the chain. The program, stored in memory of the control means, multiplies the time ratio by the chain pitch to calculate a linear distance for chain stretch. The chain pitch is previously input and stored in memory in the control means. The chain stretch is the linear distance in which the chain has lengthened from its original length between said first and second sensing means due to the chain wearing. A predetermined value for chain stretch is input into the control means and stored in memory. When the chain stretch extends beyond said predetermined valued an output is provided indicating that the chain should be serviced.

The present invention also provides means for calculating the instantaneous chain speed. The stored program in the control means multiplies the chain pitch by the second time interval, which is the time required for one chain pitch to travel past one of the first or second sensing means, to determine the instantaneous speed of the chain. A range of permitted instantaneous chain speed values may be input into the control means and stored in memory, and if the instantaneous chain speed extends outside of the predetermined range, an output is provided indicating that the conveyor chain should be serviced.

To this end, the objects of the present invention are to provide a new and improved method for automatically and accurately monitoring the wear of a continuous conveyor chain without having to stop the chain; to provide a new and improved method and apparatus for automatically monitoring the wear of a continuous conveyor chain that calculates a linear distance for chain stretch and indicates whether the chain stretch is beyond an acceptable level; and to provide a new and improved method and apparatus for monitoring wear of a continuous conveyor chain that calculates a value for instantaneous chain speed and indicates when the chain speed is outside an acceptable level.

BRIEF DESCRIPTION OF THE DRAWINGS

The various and other uses of the present invention will become more apparent by referring to the following detailed descriptions and drawings in which:

FIG. 3 is a graphic representation of the actuation of the photoelectric sensors between a first state and a second state and showing the differences between zero chain stretch and chain stretch greater than zero;

DESCRIPTION OF THE PREFERRED EMBODIMENT

Figure 1:
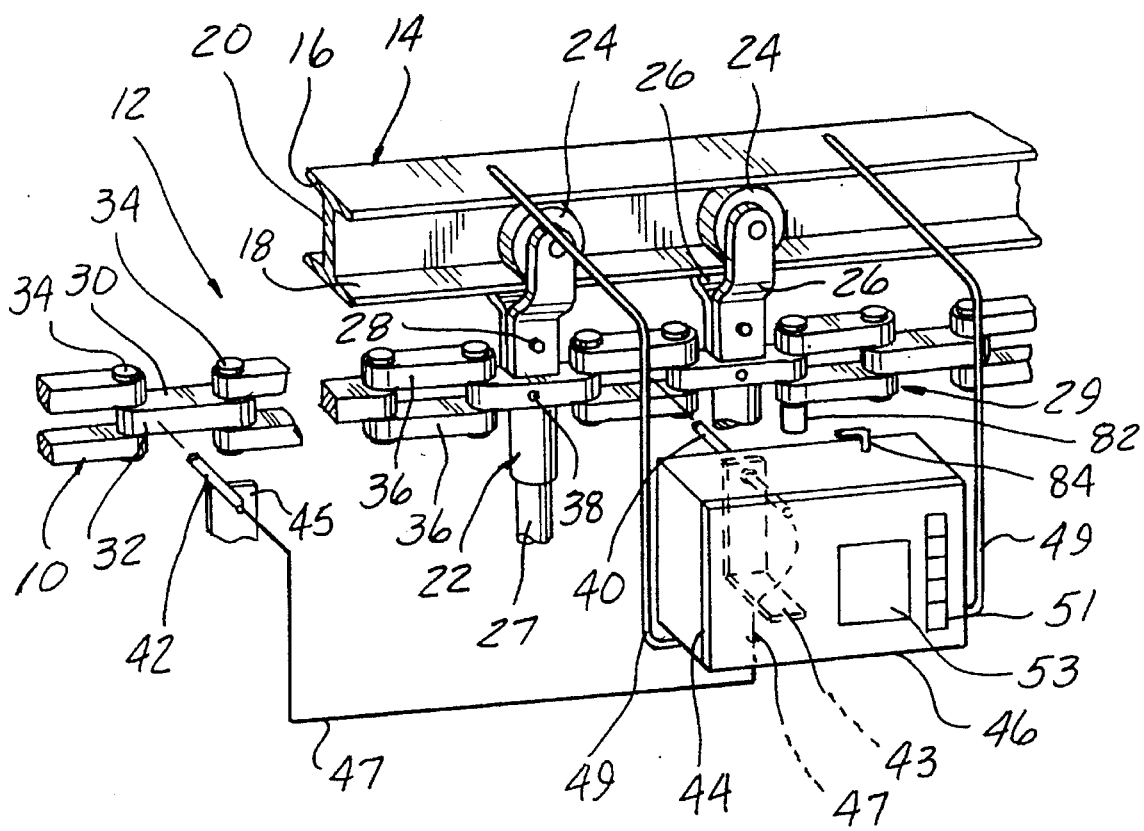
FIG. 1 is a perspective view showing the conveyor chain and wheeled trolleys with the pair of photoelectric sensors adjacent and along said conveyor chain.

FIG. 1 is a perspective view showing the present invention being utilized to automatically monitor the wear of a conveyor chain 10 utilized in a moveable conveyor 12. The conveyor 12 is in the form of a continuous closed-loop path having an elongated continuous track or guideway 14. Preferably the track or guideway 14 is in the form of an I-beam having spaced, horizontally extending legs 16, 18 which are interconnected by a vertical intermediate web portion 20. The lower horizontal leg 18 forms a track for a plurality of trolleys 22 which move therealong. Each of the trolleys 22 include two rollers or wheels 24 (only one shown) which ride along the horizontal leg 18 of the I-beam 14 on opposite sides of the intermediate web 20.

Arms 26 are connected to and descend downward from each of the rollers 24 and are interconnected at a lower end of the arms 26 by a conventional fastener 28. A hanger 27 is connected to the lower end of the arms 26 on each trolley 22 for supporting parts or components (not shown) therefrom.

Figure 2:
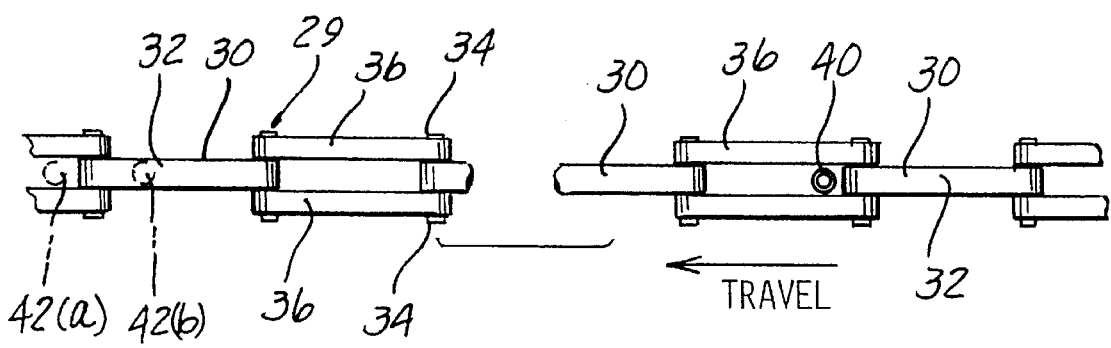
FIG. 2 is a side view of the conveyor chain showing the positioning of the photoelectric sensors with respect to the conveyor chain.

As seen in FIGS. 1 and 2, the conveyor chain 10 is formed of a plurality of interconnected successive chain links 29. Each chain link 29 provides an integral one-piece primary link 30 and an adjacent connecting link 36. The primary link 30 has a solid perimeter surface 32 with apertures (not shown) at each of their ends extending therethrough. Pivot pins 34 are utilized to pivotally connect the primary links 30 of the chain to the alternating connecting links 36. The connecting links 36 utilize a pair of spaced, substantially parallel members extending across the top and bottom portions of the primary links 30. A space is created between the substantially parallel connecting links 36 as well as between adjacent successive primary links 30.

As seen in FIG. 1, each of the primary links 30 have a centrally disposed opening (not shown) therethrough wherein the trolley 22 extends therethrough and is connected to the primary link 30 by a conventional fastener 38. The chain 10 is driven in a conventional manner, such as a motorized sprocket (not shown), so that forces transmitted through the primary links 30 to the trolleys 22 cause movement of the trolleys 22 along the track 14.

In order to monitor wear of the conveyor chain 10, a first and second means for sensing the primary links 30 are fixedly mounted along the chain 10 at a predetermined distance. In the preferred embodiment, a pair of photoelectric sensors 40, 42 are utilized as the first and second sensing means, respectively. Other sensing devices may also be utilized such as proximity switches, photodiodes, lasers, limit switches and any other compatible sensing devices. The photoelectric sensors 40, 42 are fixedly mounted adjacent the primary links 30 such that the photoelectric sensors 40, 42 may sense the presence and absence of the primary links 30 as the chain 10 travels in front of the photoelectric sensors 40, 42. A bracket 43 is shown extending from an enclosure 44 for supporting the first photoelectric sensor 40 in a fixed position. A similar bracket 45 is also partially shown supporting the second photoelectric sensor 42 in a fixed position wherein the bracket 45 may be mounted to any fixed structure (not shown). The photoelectric sensors 40, 42 generate signals by sensing the presence and absence of the primary links 30, and these signals are sent to a control means 46 via electrical wires 47.

In order to process the signals, the control means 46 includes a processing means, a program stored in memory for performing calculations, a memory for storing values, means for inputting values 51 and means for outputting values 53. The control means 46 is housed within the enclosure 44, and the enclosure 44 is supported by a tubular bracket 49 which extends outward from and is connected to the upper leg 16 of the I-beam 14.

In the preferred embodiment, the pair of photoelectric sensors 40, 42 are spacedly mounted at common locations with respect to the primary links 30 when the chain stretch is zero or when an initial origin for monitoring wear of the chain 10 is established. As seen in FIG. 2, the second photoelectric sensor 42 is represented by 42(a) when the chain stretch is zero. As seen in FIG. 3, when the chain 10 is moving, the photoelectric sensors 40 and 42 or SW1 and SW2, respectively, are actuated simultaneously between a first state 48, wherein the photoelectric sensors 40, 42 sense the presence of a primary link 30, and a second state 50, wherein the photoelectric sensors 40, 42 sense the absence of the primary link 30, or in other words, the photoelectric sensors 40, 42 sense the space separating successive primary links 30. As previously mentioned, the photoelectric sensors 40, 42 are spaced a predetermined distance from one another. Preferably, the sensors 40, 42 are spaced ten feet apart or ten chain links 29 apart if each chain link 29 is one foot long. Thus, the actuation of the sensors 40, 42 correspond to link 1 and link 10, respectively, as seen in FIG. 3.

Over an extended period of time, the conveyor chain 10 will begin to wear as the pivot pins 34 and the chain links 29 begin to wear thus causing "slop" within the chain 10. When the chain 10 is pulled taught, the wear or "slop" will be realized as a lengthening or stretching of the chain 10. As the chain 10 stretches or lengthens and as the chain 10 continues to travel about its continuous loop, the second photoelectric sensor 42 begins to actuate into the first state 48 prior to the first photoelectric sensor 40 actuating into the first state 48 as the lengthening of the chain 10 causes the second photoelectric sensor 42 to sense the primary link 30 prior to the first photoelectric sensor 40 sensing a primary link 30 a predetermined number of chain links 29 away. In other words, the lengthening of the chain 10 due to wear places the second photoelectric sensor 42 in a position depicted by 42(b) in FIG. 2, and thus, the photoelectric sensors 40, 42 do not actuate simultaneously. The time interval between the non-simultaneous actuation of the photoelectric sensors 40, 42 can be directly related to the chain stretch as described in detail below.

Figure 4:
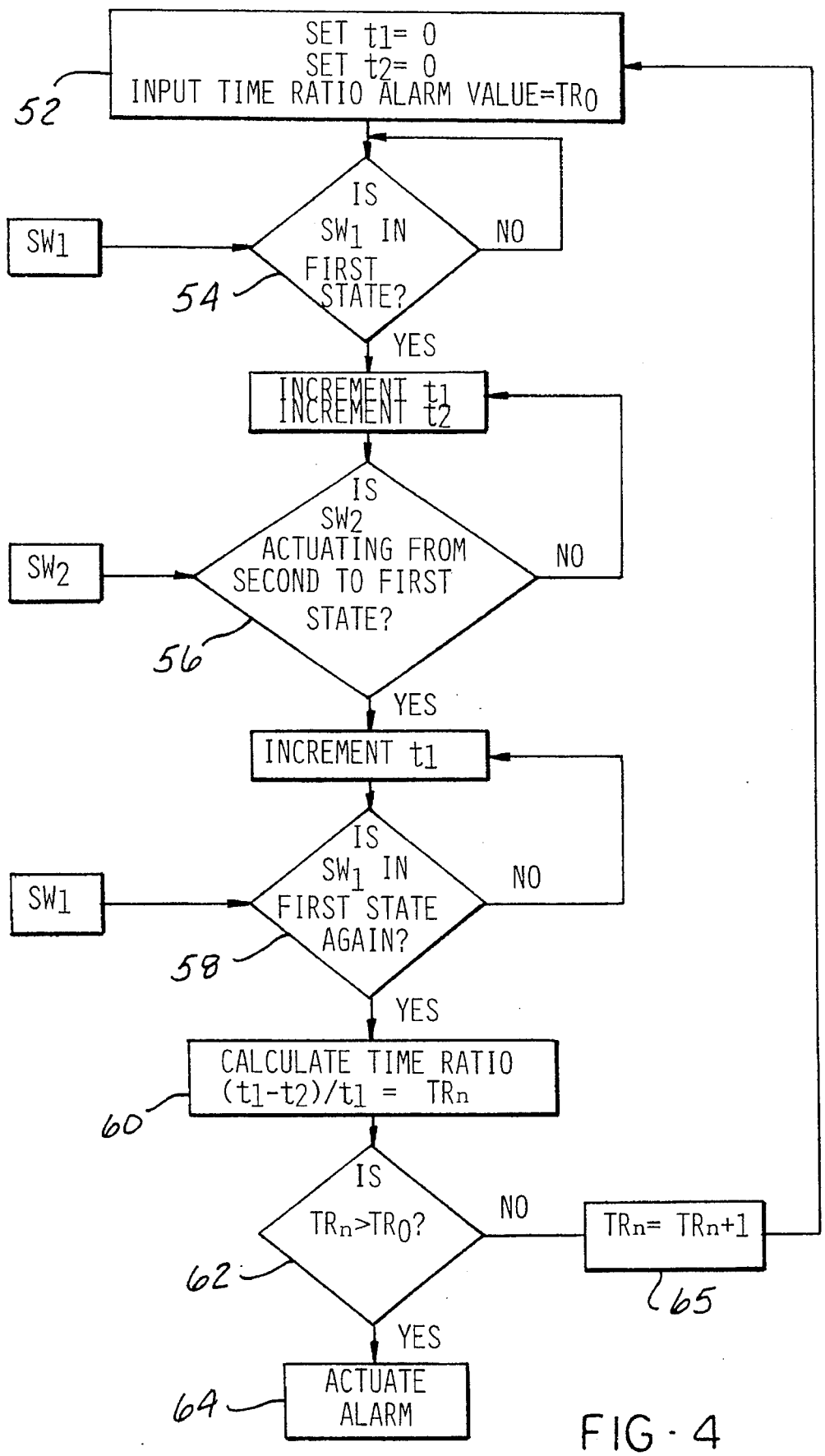
FIG. 4 is a flow chart illustrating the signal processing logic of the invention for determining the time intervals and the time ratio.

The method and system for monitoring the wear of the conveyor chain 10, using only the time intervals between the actuation of the photoelectric sensors 40, 42, may be understood with reference to the flow chart shown in FIG. 4. As noted in data entry block 52, timing intervals t1 and t2 are reset to zero, and a time ratio alarm value $TR_o$ may be input by the inputting means 51 and stored in memory. The processing means receives the signals sent by the photoelectric sensors 40, 42, and the signal from the first photoelectric sensor 40 is processed by query block 54. If the first photoelectric sensor 40 is in the first state 48, a clock pulse counter for each of the sensors 40, 42 and provided by the control means 46 begins to increment or count pulses. If the first photoelectric sensor 40 is not in the first state 48 (i.e. in the second state 50), then the processing means updates the signal from the first photoelectric sensor 40 until the signal from the first photoelectric sensor 40 is in the first state 48.

If the chain 10 has stretched or lengthened, the second photoelectric sensor 42 will already be in the first state 48 when the first photoelectric sensor 40 is actuated into the first state 48, as best shown in FIGS. 2 and 3. Thus, both counters continue to count until the second photoelectric sensor 42 is actuated into the second state 50 and back into the first state 48 as depicted by query block 56 in FIG. 4. If the second photoelectric sensor 42 is actuated back into the first state 48, the counter associated with the second photoelectric sensor 42 stops counting, and the control means records the value as the second time interval t2. If the second photoelectric sensor 42 has not actuated back into the first state 48, then the counters continue to count and update the signal from the second photoelectric sensor 42.

The counter associated with the first photoelectric sensor 40 continues to increment until the first photoelectric sensor 40 actuates into the second state 50 and returns back to the first state 48 for the second time, as depicted by query block 58. Once the first photoelectric sensor 40 returns to the first state 48 for the second time, the counter stops incrementing, and the value is stored in memory as first time interval t1.

As shown in calculation block 60, a time ratio $TR_n$ is calculated by taking the difference between the first time interval t1 and the second time interval t2 and dividing by the count of the first time interval t1. The time ratio $TR_n$ is compared to the predetermined time ratio alarm value $TR_o$ which was previously input and stored in memory in the control means 46. As shown in query block 62, if the time ratio $TR_n$ is greater than the preprogrammed time ratio alarm value $TR_o$, an indicator or alarm is actuated, as shown in data block 64, to warn the operator that the chain 10 has exceeded its allowable wear and that the chain 10 should be serviced. The indicator or alarm may comprise a warning light, message display or audible alarm provided by the output means 53 of the control means 46. If the calculated time ratio $TR_n$ is less than the time ratio alarm value $TR_o$, then the wear has not reached an unacceptable value, and the process starts over by monitoring the next section of chain 10 as depicted by data block 65.

Figure 5:
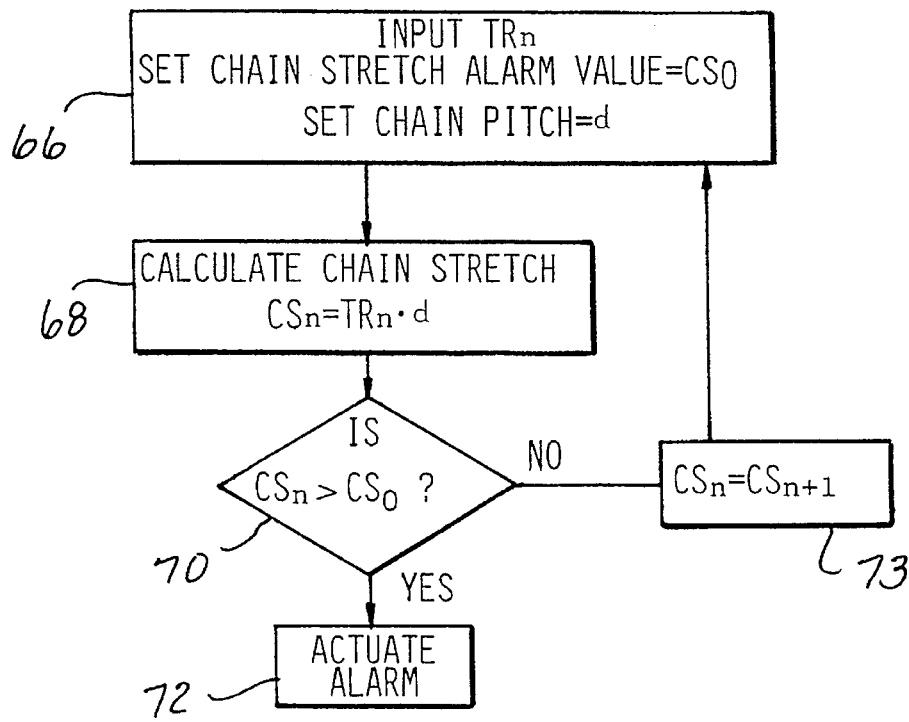
FIG. 5 is a flow chart illustrating the signal processing logic of the invention for determining chain stretch.

The method for calculating a linear distance for the chain stretch which corresponds to the linear distance in which the chain 10 has lengthened over the distance between the photoelectric sensors 40, 42 due to the chain 10 wearing may be understood with reference to the flow chart in FIG. 5. As seen in data entry block 66, the time ratio $TR_n$ has previously been determined, and the chain pitch d and chain stretch alarm value $CS_o$ are input by the inputting means 51 and stored in memory within the control means 46. Calculation block 68 calculates chain stretch $CS_n$ by multiplying the time ratio $TR_n$ by the chain pitch d wherein the chain pitch d is the linear distance between common locations on successive chain links 29 when the chain stretch is zero. Since the chain pitch d is defined as a constant value, only the time ratio $TR_n$ is needed to identify the amount of wear in the chain 10, as the chain stretch $CS_n$ simply becomes a multiple of the time ratio $TR_n$. As provided in query block 70, if the calculated chain stretch $CS_n$ extends beyond the predetermined value $CS_o$, an indicator or alarm will actuate, as shown in data block 72, and will notify an operator that the chain stretch $CS_n$ has exceeded an allowable amount and that the chain 10 should be serviced. Again, the indicator or alarm may comprise a message display, warning lights or audible alarm provided by the output means 53. If the calculated chain stretch $CS_n$ does not extend beyond the predetermined value $CS_o$, then the chain stretch $CS_n$ is acceptable, and the method starts again with the monitoring of the next segment of chain 10 as depicted by data block 73.

Figure 6:
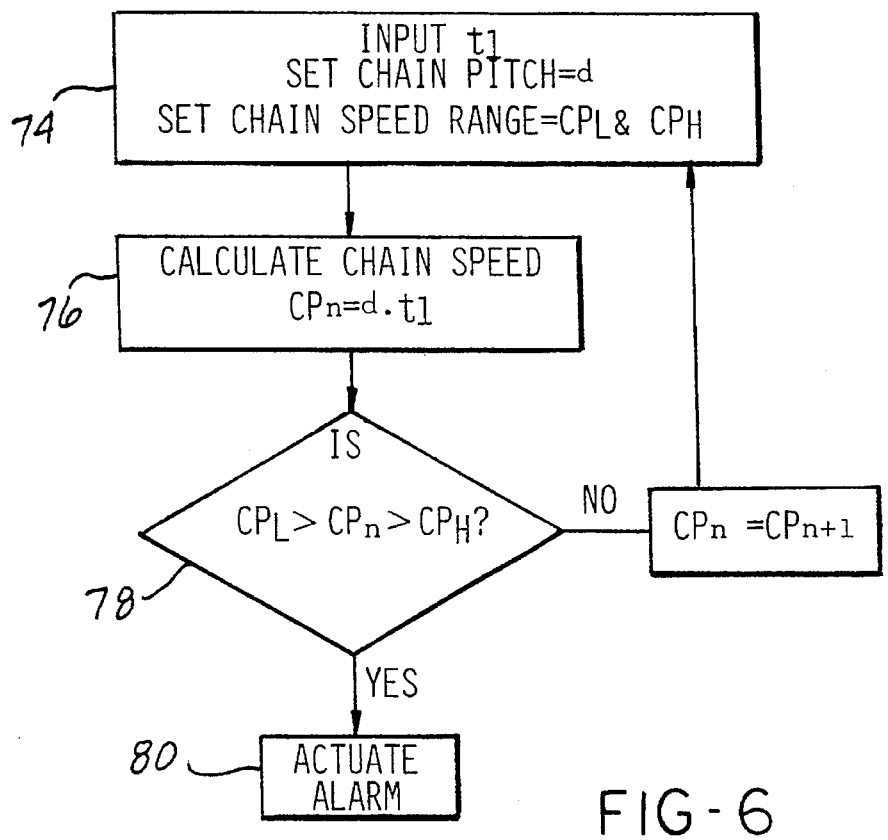
FIG. 6 is a flow chart illustrating the signal processing logic of the invention for determining instantaneous chain speed.

The control means 46 may also calculate the instantaneous chain speed as shown by the flow chart in FIG. 6. A predetermined allowable range for the instantaneous chain speed CPL, CPH is input by the inputting means 51 and stored in memory in the control means 46 as shown in data entry block 74. As shown in calculation block 76, instantaneous chain speed $CP_n$ may be determined by multiplying the chain pitch d by the first time interval t1 wherein the chain pitch d has already been input and stored in the control means, and the first time interval t1 has been previously calculated. As seen in query block 78, if the instantaneous chain speed $CP_n$ extends outside the range of allowable instantaneous chain speed values CPL, CPH, an alarm or indicator is actuated, as shown by data block 80, and alerts an operator that the instantaneous chain speed $CP_n$ is outside of the allowable ranger and thus, the conveyor chain 10 should be serviced. Once again, the alarm or indicator 80 may be a message display, warning lights or an audible alarm provided by the output means 53.

In order to prevent the alarms or indicators from actuating prematurely, an alarm debounce time may be utilized to prevent the alarms or indicators from occurring until the condition has existed for a predetermined amount of time.

This is especially useful to prevent alarms from actuating prematurely when the conveyor 12 is first starting up. Chain speed $CP_n$, as well as the first and second time intervals t1, t2, respectively, may be temporarily beyond their range or limits during this period.

Since the photoelectric sensors 40, 42 are actuated by each chain link 29 of the chain 10, the above-noted calculations are essentially made after each indexing of a chain link 29 in the chain 10. Within the industry, it is common to measure ten foot sections of the chain 10 wherein the chain pitch d is twelve inches or one foot long. Such conveyor chains 10 may extend for several thousand of feet, and therefore, it is not practical to store and update the above-noted calculations for each chain link 29 of the chain 10. Therefore, the control means 46 may be programmed to update and store the associated values every tenth link or reading such that each ten foot section of the chain 10 is essentially measured for chain wear. The control means 46 stores and identifies each ten foot section of the chain 10 so that a history of wear may be kept and recorded for each particular ten foot section of chain 10. The stored values may then be downloaded on a daily, weekly or monthly basis, and a graph may be plotted to determine the performance characteristics, i.e. chain wear and chain speed, of the chain.

A magnetic origin point 82, as seen in FIG. 1, may be utilized to establish the origin of the chain 10 in order that the control means 46 can reset a registry within the control means 46 for the first chain link 29 upon a separate sensor 84 sensing the origin of the chain 10. By determining the origin of the chain 10, each ten foot section of the chain 10 can be identified, and thus, repetitive wear data can be accumulated and maintained for each section of chain 10. Any odd number of chain links 29 which may be incorporated in the last section of chain 10 will be discarded as the control means may require ten readings before it will store and update a new reading.

As noted above, the signals from the photoelectric sensors 40, 42 are generated and processed for every chain link 29, although not every set of values is stored in memory. Therefore, it may be desirable to take an average of several time interval values, such as the previous three values, in order to avoid any type of unusual or inaccurate reading which may lead to a faulty alarm or indicator.

In an alternative embodiment, the photoelectric sensors 40, 42 may be mounted at different locations with respect to the primary links 30 when initially setting up the sensors 40, 42 to monitor wear of the chain 10. When the sensors 40, 42 are mounted at different locations with respect to the primary links 30, the photoelectric sensors 40, 42 do not actuate simultaneously even though chain stretch may be non-existent, and thus, the initial time interval $t_0$ between the actuation of the photoelectric sensors 40, 42 into the first state 48 may be preprogrammed into the control means 46. The initial time interval $t_0$ may then be subtracted from the first time interval t1 between the actuation of the photoelectric sensors 40, 42, and therefore, the first time interval t1 is compensated so that it is equivalent to the same first time interval t1 as the preferred embodiment.

It should also be noted that the counters increment in pulses or segments that are sixteen milliseconds long. Thus, the control means first multiplies the number of counts by sixteen milliseconds in order to convert the count or pulses into seconds. The present invention is not limited to a count or pulse of sixteen milliseconds, but rather, the pulses may be equivalent to any desired length of time depending on the application. A sixteen millisecond count has been utilized in the preferred embodiment as a sufficient length of time for the accuracy desired for the present application.

It should be noted that the present invention is not limited to a conveyor chain or continuous chain, but rather, the present invention may be utilized for any type of moving chain wherein the chain stretches due to wear and where it is desirable to monitor chain wear without having to stop the chain.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for monitoring wear of a continuous chain having a plurality of links successively connected comprising the steps of:

spacedly positioning a pair of sensors along said chain wherein said sensors generate signals by sensing the presence and absence of each of said links;

processing said signals generated by said sensors to calculate the necessary time intervals for providing an output indicative of chain wear wherein said signals are continually generated and processed for each of said links throughout said entire continuous chain to provide an output indicative of chain wear of any portion of said chain; and providing an indicator when said output exceeds a predetermined value.

2. The method as stated in claim 1 wherein processing the signals further comprises the steps of:

calculating a first time interval between actuation of said pair of sensors while sensing the presence of each of said links;

counting a second time interval for said chain to travel between common locations on successive links past one of said pair of sensors; and calculating a time ratio of said first time interval over said second time interval.

3. The method as stated in claim 1 further comprising the steps of:

providing an alarm delay time wherein said time ratio must exceed said predetermined value for a time period exceeding said alarm delay time for said indicator to activate.

4. A method for monitoring wear of a continuous chain having a plurality of links successively connected comprising the steps of:

spacedly positioning a pair of sensors along said chain wherein said sensors generate signals by sensing the presence and absence of each of said links;

calculating a first time interval between actuation of said pair of sensors when sensing the presence of each of said links;

counting a second time interval for said chain to travel between common locations on successive links past one of said pair of sensors;

calculating a time ratio of said first time interval over said second time interval;

inputting a predetermined chain pitch value wherein said chain pitch is the linear distance between common locations on successive chain links; and calculating chain stretch by multiplying said chain pitch by said time ratio to provide a linear distance by which said chain has lengthened between said pair of sensors.

5. The method stated in claim 4 further comprising the steps of:

providing an indicator when said chain stretch exceeds a predetermined value.

6. The method as stated in claim 4 further comprising the steps of:

calculating instantaneous chain speed by multiplying said chain pitch by said second time interval.

7. The method as stated in claim 6 further comprising the steps of:

inputting a predetermined range of desired values for instantaneous chain speed; and providing an indicator when said instantaneous chain speed extends outside of said predetermined range of desired values for said instantaneous chain speed.

8. A method for monitoring wear of a continuous chain having a plurality of links successively connected comprising the steps of:

positioning a pair of photoelectric sensors along and adjacent said chain wherein said photoelectric sensors are independently actuated by sensing the presence and absence of each of said links;

calculating an initial time interval between the actuation of said photoelectric sensors when said chain stretch is zero;

calculating a first time interval between the actuation of said pair of photoelectric sensors when sensing the presence of each of said links;

counting a second time interval for said chain to travel between common locations on successive links past one of said pair of photoelectric sensors;

calculating a time ratio of said first time interval less said initial time interval over said second time interval wherein said time ratio is continuously calculated throughout said entire continuous chain to provide an output indicative of chain wear of any portion of said chain; and providing an indicator when said time ratio exceeds a predetermined value.

9. The method as stated in claim 8 further comprising the steps of:

providing an indicator when said chain stretch exceeds a predetermined value.

10. The method as stated in claim 8 further comprising the steps of:

calculating instantaneous chain speed by multiplying said chain pitch by said second time interval.

11. The method as stated in claim 8 further comprising the steps of:

providing an alarm delay time wherein said time ratio must exceed said predetermined value for a time period exceeding said alarm delay time before said indicator will activate.

12. The method as stated in claim 8 further comprising the steps of:

presetting said initial time interval at zero wherein said photoelectric sensors are positioned at common locations with respect to said links so that said photoelectric sensors are simultaneously actuated when said chain stretch is zero.

13. The method as stated in claim 8 further comprising the steps of:

means for sensing a predetermined origin point on said continuous chain for monitoring and identifying common segments of said chain.

14. A method for monitoring wear of a continuous chain having a plurality of links successively connected comprising the steps of:

positioning a pair of photoelectric sensors along and adjacent said chain wherein said photoelectric sensors are independently actuated by sensing the presence and absence of said links;

calculating an initial time interval between the actuation of said photoelectric sensors when said chain stretch is zero;

calculating a first time interval between the actuation of said pair of photoelectric sensors when sensing the presence of each of said links;

counting a second time interval for said chain to travel between common locations on successive links past one of said pair of photoelectric sensors;

calculating a time ratio of said first time interval less said initial time interval over said second time interval;

providing an indicator when said time ratio exceeds a predetermined value;

inputting a predetermined chain pitch value wherein said chain pitch is the linear distance between common locations on successive chain links; and calculating chain stretch by multiplying said chain pitch by said time ratio to provide a linear distance by which said chain has lengthened between said pair of photoelectric sensors due to said chain wearing.

15. A method comprising the steps of:

positioning a pair of photoelectric sensors along and adjacent said chain wherein said photoelectric sensors are independently actuated by sensing the presence and absence of said links;

calculating an initial time interval between the actuation of said photoelectric sensors when said chain stretch is zero;

calculating a first time interval between the actuation of said pair of photoelectric sensors when sensing the presence of said links;

counting a second time interval for said chain to travel between common locations on successive links past one of said pair of photoelectric sensors;

calculating a time ratio of said first time interval less said initial time interval over said second time interval;

providing an indicator when said time ratio exceeds a predetermined value;

inputting a predetermined range of desired values for instantaneous chain speed; and providing an indicator when said instantaneous chain speed extends outside of said predetermined range of desired values for said instantaneous chain speed.

16. The method for monitoring wear of a continuous chain having links spacedly connected comprising the steps of:

spacedly positioning a pair of photoelectric sensors at fixed locations along said chain at a predetermined distance wherein said sensors are positioned at common locations with respect to said links so that said photoelectric sensors are simultaneously actuated between a first state, wherein the presence of said links are sensed by said photoelectric sensors, and a second state, wherein the absence of said links are sensed by said sensors, when said chain stretch is zero;

calculating a first time interval between actuation of said photoelectric sensors into said first state when said chain begins to lengthen by wearing;

timing a second interval for said chain to travel between common locations on successive links past one of said pair of photoelectric sensors;

inputting a predetermined chain pitch value wherein said chain pitch is the linear distance between common locations on successive links of said chain;

calculating chain stretch by dividing said first time interval by said second time interval and multiplying by said chain pitch;

inputting a predetermined value for said chain stretch; and providing an indicator when said chain stretch exceeds said predetermined value for said chain stretch.

17. The method as stated in claim 16 further comprising the steps of:

calculating instantaneous chain speed by multiplying said chain pitch by said second time interval;

inputting a predetermined chain speed range for said instantaneous chain speed; and providing an indicator when said instantaneous chain speed is outside of said predetermined chain speed range for said chain speed.

18. An apparatus for monitoring the wear of a continuous chain having a plurality of links successively connected comprising:

first and second means, spacedly positioned along said chain, for sensing the presence of each of said links;

means for processing the signals generated by said sensors to calculate the necessary time intervals for providing an output indicative of said chain wear wherein said signals are continually generated and processed for each of said links throughout said entire continuous chain to provide an output indicative of chain wear of any portion of said chain; and means for indicating when said output exceeds a predetermined value.

19. The apparatus as stated in claim 18 wherein said processing means comprises:

means for calculating a first time interval between the actuation of said first and second sensing means sensing the presence of said links;

means for timing a second time interval for said chain to travel between common locations on successive links past one of said first and second sensing means; and means for calculating a time ratio of said first time interval over said second time interval.

20. The apparatus as stated in claim 18 including:

means for monitoring chain wear comprising the steps of:

spacedly positioning said first and second sensing means along said chain wherein said first and second sensing means generate signals by sensing the presence and absence of said links;

processing signals generated by said first and second sensing means to calculate the necessary time intervals for providing said output indicative of chain wear; and actuating said indicating means when said output exceeds said predetermined value.

21. An apparatus for monitoring the wear of a continuous chain having a plurality of links successively connected comprising:

first and second means, spacedly positioned along said chain, for sensing the presence of said links;

means for processing the signals generated by said sensors to calculate the necessary time intervals for providing an output indicative of chain wear;

means for indicating when said output exceeds a predetermined value;

means for inputting a predetermined chain pitch value wherein said chain pitch value is the linear distance between common locations on successive links; and means for calculating chain stretch by multiplying said chain pitch by said time ratio to provide a linear distance by which said chain has lengthened between said first and second sensing means due to said chain wearing.

22. The apparatus as stated in claim 21, further comprising:

means for inputting a predetermined value for said chain stretch; and said indicating means activating when said chain stretch exceeds said predetermined value for said chain stretch.

23. The apparatus as stated in claim 21, further comprising:

means for calculating instantaneous chain speed by multiplying said chain pitch by said second time interval;

means for inputting a predetermined chain speed range for said instantaneous chain speed; and said indicating means activating when said instantaneous chain speed is outside said predetermined chain speed range for said instantaneous chain speed.

* * * * *

UNITED STATES PATENT AND TRADEMARK OFFICE
CERTIFICATE OF CORRECTION

PATENT NO. : 5,563,392
DATED : October 8, 1996
INVENTOR(S) : Brown, et al.

Page 1 of 1

It is certified that error appears in the above-identified patent and that said Letters Patent is hereby corrected as shown below:

Column 3,
Line 1, delete "multiplies" and insert --divides--.

Column 6,
Line 51, delete "multiplying" and insert --dividing--.

Column 9,
Line 10, delete "multiplying" and insert --dividing--.
Line 50, delete "multiplying" and insert --dividing--.

Column 11,
Line 19, delete "multiplying" and insert --dividing--.

Column 12,
Line 42-43, delete "multiplying" and insert --dividing--.

Fig. 6, Block 76, delete "$CP_n = d \cdot t1$" and insert --$CP_n = d \div t1$--.

Signed and Sealed this

Third Day of July, 2001

*Attest:*

*Attesting Officer*

NICHOLAS P. GODICI
*Acting Director of the United States Patent and Trademark Office*